United States Patent [19]

Nakayama

[11] Patent Number: 5,306,039
[45] Date of Patent: Apr. 26, 1994

[54] PASSENGER'S AIR BAG ASSEMBLY

[75] Inventor: Yoshikazu Nakayama, Hikone, Japan

[73] Assignee: Takata Corporation, Tokyo, Japan

[21] Appl. No.: 820,652

[22] PCT Filed: Jun. 21, 1991

[86] PCT No.: PCT/JP91/00841
§ 371 Date: Jan. 17, 1992
§ 102(e) Date: Jan. 17, 1992

[87] PCT Pub. No.: WO92/00206
PCT Pub. Date: Jan. 9, 1992

[30] Foreign Application Priority Data

Jun. 22, 1990 [JP] Japan .................................. 2-164638

[51] Int. Cl.⁵ .............................................. B60R 21/22
[52] U.S. Cl. .................................. 280/728 A; 280/732
[58] Field of Search ........... 280/743, 728, 732, 743 R, 280/728 B, 728 R, 728 A

[56] References Cited

U.S. PATENT DOCUMENTS

| | | | |
|---|---|---|---|
| 4,842,300 | 6/1989 | Ziomek et al. | 280/743 |
| 4,989,896 | 2/1991 | DiSalvo et al. | 280/743 |
| 5,060,972 | 10/1991 | Satoh et al. | 280/743 |
| 5,080,393 | 1/1992 | Dixon, Jr. et al. | 280/743 |
| 5,096,222 | 3/1992 | Komerska et al. | 280/743 |

FOREIGN PATENT DOCUMENTS

| | | |
|---|---|---|
| 48-64637 | 9/1973 | Japan . |
| 9013458 | 11/1990 | PCT Int'l Appl. . |
| 2236082 | 3/1991 | United Kingdom . |

Primary Examiner—Karin L. Tyson
Attorney, Agent, or Firm—Kanesaka and Takeuchi

[57] ABSTRACT

A passenger's air bag assembly includes a container (12), an air bag (18) held in a folded condition in the container (12), an inflator (16) held in the container (12) and adapted to deploy the air bag (18), and a modular cover (14) attached to the container (12) to cover the air bag (18). A cloth (18b) is disposed between the modular cover (14) and the air bag (18) to improve the durability of the air bag.

2 Claims, 5 Drawing Sheets

PASSENGER'S AIR BAG ASSEMBLY

TECHNICAL FIELD

The Present invention relates to a passenger's air bag assembly inflatable to protect a passenger in a crash.

BACKGROUND ART

A passenger's air bag assembly of this type includes a holder (for example, container) to which an air bag in a folded condition and an inflator are attached. A modular cover is also attached to cover the air bag. The inflator is actuated in a collision so as to deploy the air bag. Deployment of the air bag causes opening of the modular cover in the interior of a vehicle. The air bag is then fully deployed to protect a vehicle occupant.

The modular cover includes a tear line or a bending line. When the inflator is actuated, the air bag forces the modular cover to be ruptured along the tear line or to be bent along the bending line. The modular cover is thus opened in the interior of the vehicle.

Typically, ribs are formed in the rear surface of a modular cover for a passenger's air bag assembly so as to increase the rigidity of the modular cover. When vibration is transferred from a vehicle to the air bag assembly, the air bag may be worn or impaired as a result of rubbing between the air bag in a folded condition and those ribs. To this end, a conventional passenger's air bag assembly includes an air bag made entirely from a high strength cloth. This results in an increase in the production cost of the air bag.

DISCLOSURE OF THE INVENTION

The present invention provides a passenger's air bag assembly comprising a holder, an air bag held in a folded condition in the holder, an inflator held in the holder and adapted to deploy the air bag, and a modular cover attached to the holder to cover the air bag, wherein a cloth is disposed between the modular cover and the air bag.

With the air bag assembly of the present invention, the cloth prevents the air bag and the modular cover from rubbing against each other. Therefore, the air bag is in no way worn.

BRIEF DESCRIPTION OF THE DRAWINGS

FIG. 2 is a sectional view taken on the line II—II in FIG. 1a;

BEST MODE FOR CARRYING OUT THE INVENTION

One embodiment of the present invention will now be described with reference to the drawings.

Figure 1A:
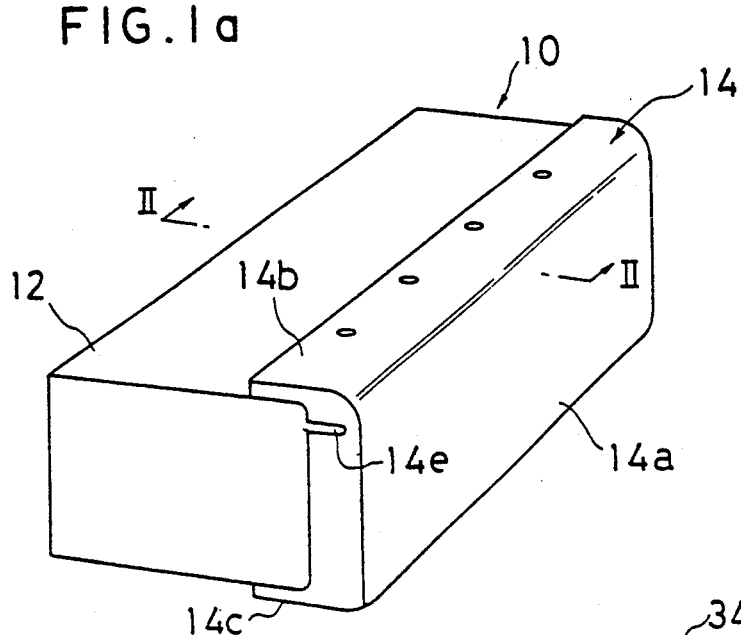
FIG. 1a is a perspective view of an air bag assembly according to one embodiment of the present invention.
Figure 1B:
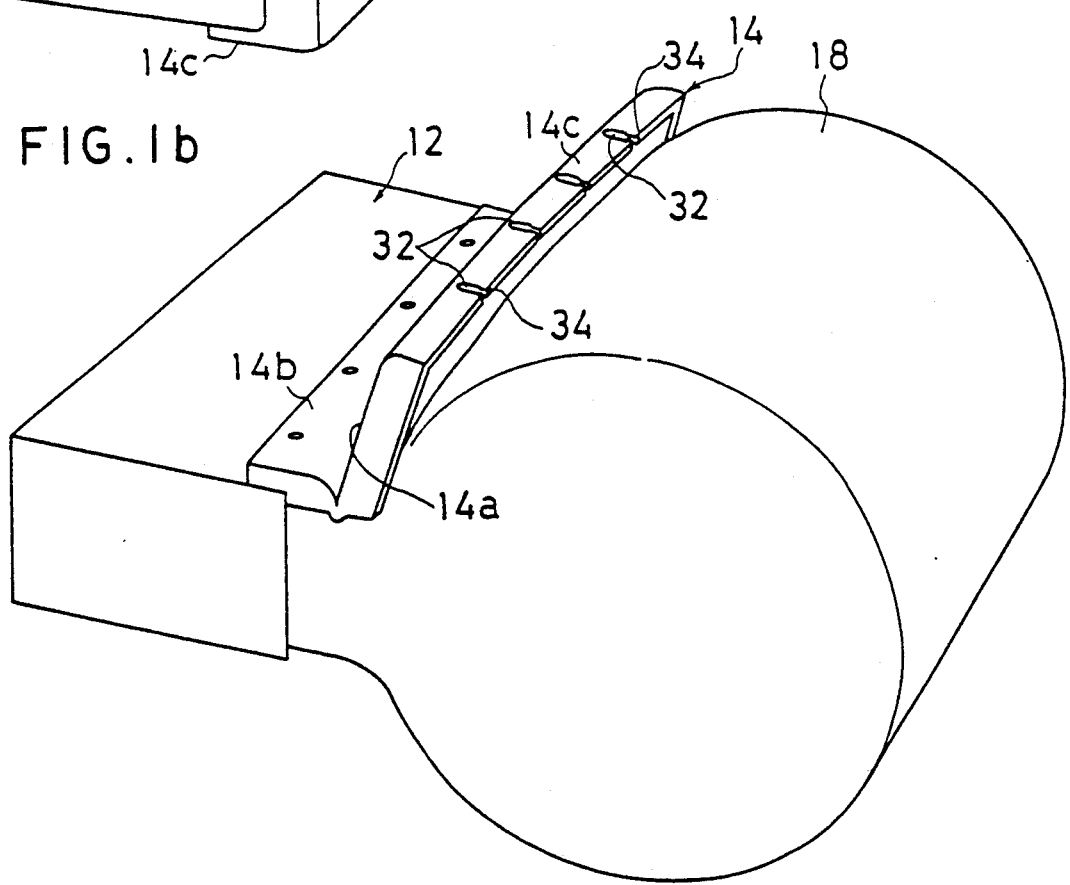
FIG. 1b is a perspective view of the air bag assembly in an inflated condition.
Figure 2:
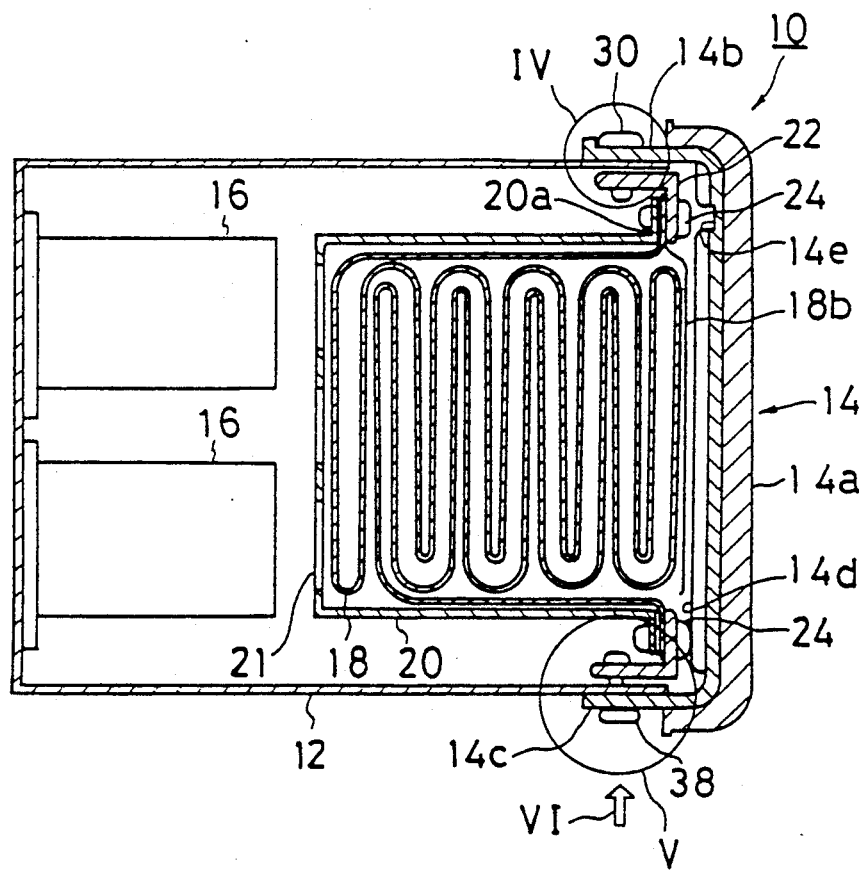
Figure 3:
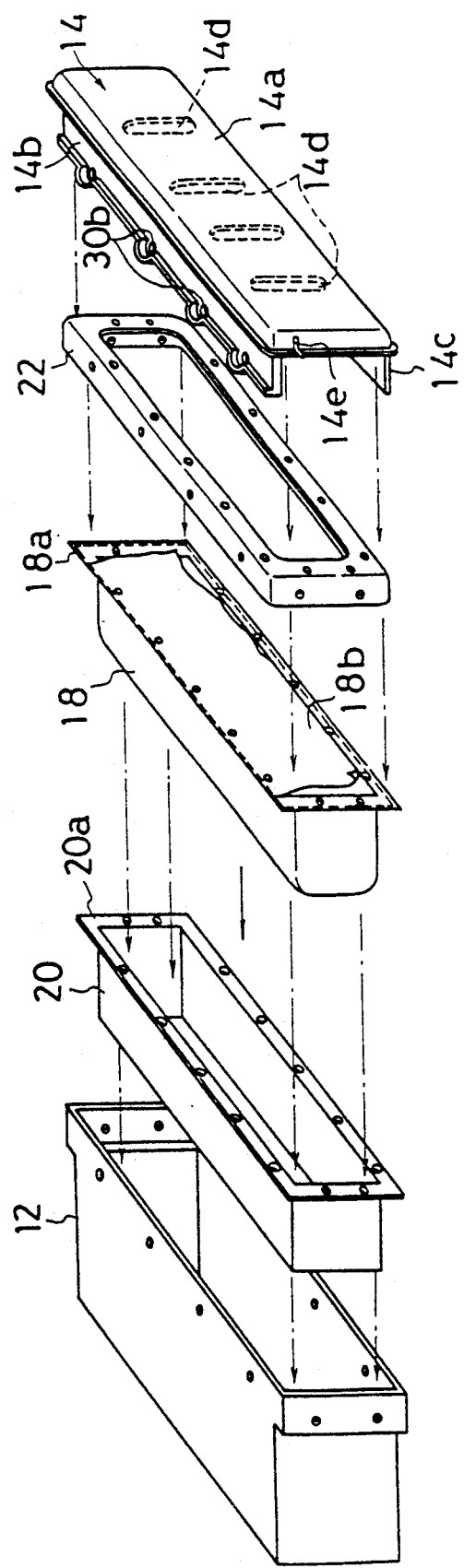
FIG. 3 is an exploded view, in perspective, of the air bag assembly.
Figure 4:
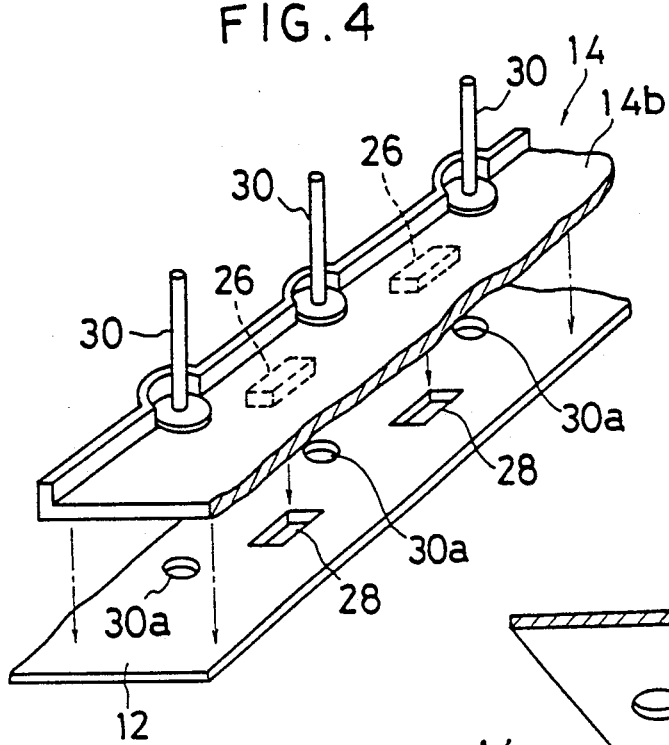
FIGS. 4 and 5 are exploded views indicated in FIG. 2, in perspective, showing the principal part of the assembly.
Figure 5:
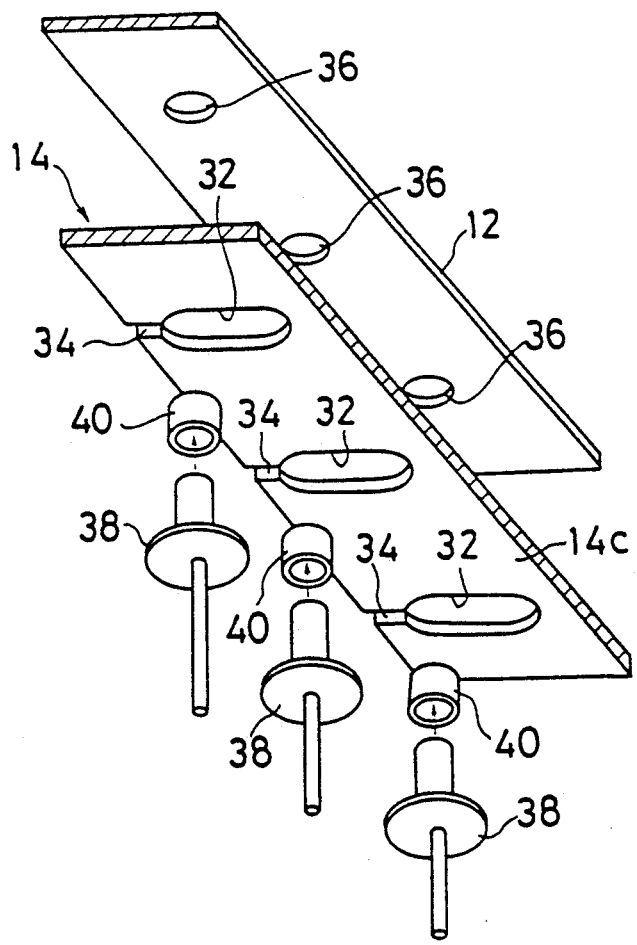
Figure 6:
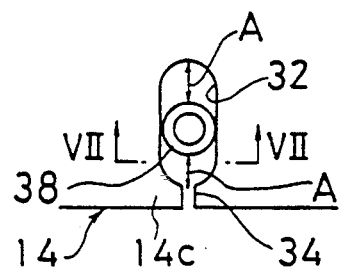
FIG. 6 is a view looking in the direction of the arrow VI in FIG. 2.
Figure 7:
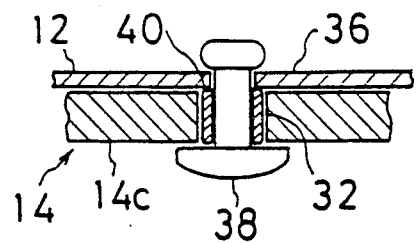
FIG. 7 is a sectional view taken on the line VII—VII in FIG. 6.
Figure 8:
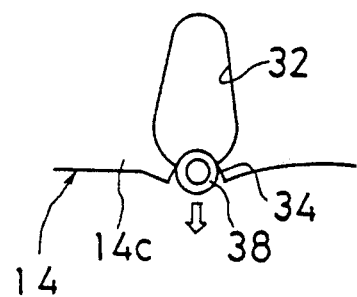
FIG. 8 illustrates a rivet removably fit in an elongated slot.

FIGS. 1 to 8 show an air bag assembly according to one embodiment of the present invention. FIG. 1a is a schematic perspective view showing the structure of the entire air bag prior to inflation. FIG. 1b is a schematic perspective view showing the air bag in an inflated condition. FIG. 2 is a detailed sectional view taken on the line II—II in FIG. 1. FIGS. 3 to 5 are exploded views of the assembly. FIGS. 6 to 8 are views showing the principal parts of the assembly.

An air bag assembly 10 includes a holder or container 12, and a modular cover 14 attached to the front of the container 12. Inflators 16 are fixedly mounted within the container 12. In this embodiment, a subcontainer 20 is inserted into the container 12 to receive an air bag 18 in a folded condition. A plurality of through holes 21 are formed in the subcontainer 20 to permit gases to flow from the inflators 16 into the subcontainer 20 so as to deploy the air bag 18.

The container 12 is a rectangular box and has an open front. A frame 22 has a L-shaped section and is attached to the inner peripheral edge of the opening of the container 12. The subcontainer 20 has a flange 20a, and the air bag 18 has a flange 18a. These flanges 20a and 18a are both secured to the rear surface of the frame 22 by rivets 24.

The reference numeral 18b indicates a cloth (masking cloth) disposed between the air bag 18 and the modular cover 14 to prevent direct contact of the air bag 18 with the modular cover 14. In this embodiment, the cloth 18b is rectangular in shape and has an upper long side fixed between the flange 18a and the frame 22, the other side of which is freely movable to form a flap.

The cloth 18b is provided to prevent the air bag 18 and the modular cover from rubbing against each other. The air bag is thus in no way worn or impaired.

The modular cover 14 has a body 14a sized to cover the front of the container 12, an upper flange 14b extending rearwardly from the upper edge of the body 14a, and a lower flange 14c extending rearwardly from the lower edge of the body 14a. A plurality of ribs 14d are formed in the rear surface of the body 14a. A slot 14e is also formed to facilitate opening of the body 14a.

FIG. 4 is an enlarged view of a portion indicated as IV in FIG. 2. As shown, a plurality of projections 26 extend from the lower surface of the upper flange 14b. A plurality of openings 28 are formed in the upper surface of the container 12 to receive the projections 26. The upper flange 14b and the container 12 are secured by rivets 30. These rivets are also intended to secure the frame 22 to the upper surface of the container 12. 30a are rivet holes formed in the container, and 30b are rivet holes formed in the modular cover.

In this embodiment, the modular cover 14 is composed of two layers, front layer (exposed to the interior of a vehicle) and a rear layer. This rear layer includes a plurality of elongated slots 32 as well as the rivet holes 30b.

FIG. 5 is an exploded view of a portion indicated as V in FIG. 2. FIG. 6 is a (bottom) view of a portion of the assembly looking in the direction of the arrow VI in FIG. 2. FIG. 7 is a sectional view taken on the line VII—VII in FIG. 6. As shown, an elongated slot 32 is formed in the lower flange 14c and extends in the direction in which the modular cover is opened (in the interior of the vehicle). Also, a slit 34 extends from one end of the slot 32 to one side of the lower flange 14c. A plurality of openings 36 are formed on the bottom of the container 12. A plurality of rivets 38 extend through the elongated slots and the openings 36 to provide a connection between the bottom of the container 12 and the lower flange 14c. A collar 40 is fit around each rivet 38 and has an outer diameter greater than the width of the slit 34.

With the air bag assembly 10 thus constructed, when the inflator 16 is actuated, the air bag is deployed to press the modular cover 14. As shown in FIG. 8, the rivets 38 and the collars 40 are then moved through the slits 34. This causes the lower half of the modular cover 14 to move forwards. Further deployment of the air bag 18 permits bending of the modular cover 14 along the groove 14e. As the modular cover 14 is opened forwards, the air bag is fully deployed in the interior of the vehicle to protect a vehicle occupant as shown in FIG. 1b.

The bottom (FIG. 2) of the (masking) cloth 18b flaps during deployment of the air bag 18 so as not to restrain the air bag 18. The air bag 18 can thus be rapidly deployed.

In the present embodiment, the lower flange 14c is formed with the slots 32, and a play (i.e., a portion A in FIG. 6) exists in the engaging portions of the lower flange 14c and the main container 12. Specifically, the lower half of the modular cover 14 is allowed to move back and forth freely in the opening direction of the modular cover 14 within a range, in which the rivets 38 can move within the slots 32. When the weight of the air bag 18 is applied to the rear side of the modular cover 14, or when a vehicle is accelerated to force the air bag 18 to press the modular cover 14, or when the air bag 18 is inflated by thermal expansion to press the modular cover 14, the bottom of the modular cover 14 is shifted toward the interior of the vehicle to prevent local application of stress to the groove 14e. Also, when the vehicle occupant presses the modular cover 14, the modular cover 14 is moved into the container 12 to prevent local application of stress to the groove 14e. This inhibits wear of the groove 14e.

As previously described, the modular cover 14 can be moved not only toward the interior of the vehicle, but also into the container 12. When the rivet 38 is in contact with one end of the elongated slot 32, the modular cover 14 can be moved only toward the other end of the slot 32. However, it is apparent that the groove 14e is still less worn than the prior art arrangement.

In the illustrated embodiment, the modular cover 14 is bent along the groove 14e. It is apparent that the modular cover of the present invention may be broken and opened in the interior of a vehicle when the air bag is deployed.

INDUSTRIAL APPLICABILITY

In the air bag assembly thus described, the cloth is disposed between the modular cover and the air bag. By this arrangement, the air bag with or without ribs is in no way worn or impaired which may occur as a result of contact with the modular cover with or without ribs or other elements. Accordingly, the air bag can be less in strength and durability than the prior art air bag. This results in a decrease in the production cost of the air bag assembly.

I claim:

1. A passenger's air bag assembly, comprising:
    a container including a main container and a subcontainer situated inside the main container, each of said main container and said subcontainer having an opening at one side, said opening having upper, lower and two side portions,
    a rectangular frame for attaching the subcontainer to the main container,
    an air bag folded and retained inside the subcontainer,
    an inflator for generating gas to inflate the air bag upon detection of a predetermined acceleration, said inflator being fixed to the main container,
    a modular cover fixed to the main container to cover the opening of the main container and having a plurality of ribs for increasing rigidity of the modular cover, said ribs being located at a side of the air bag when assembled, and
    a cloth for covering a substantially entire area of the opening of the subcontainer, said cloth having upper, lower and two side portions and being fixed to the upper portion of the subcontainer and held between the frame and the subcontainer only at the upper portion thereof so that when the air bag is folded and retained inside the subcontainer, the cloth substantially completely covers the opening of the subcontainer to thereby prevent direct contact of the air bag to the modular cover with the ribs.

2. A passenger's air bag assembly according to claim 1, wherein said subcontainer includes a flange around an opening, and said frame has L-shape in cross section, said frame being fixed to the flange of the subcontainer and to an inside of the main container.

* * * * *